UNITED STATES PATENT OFFICE.

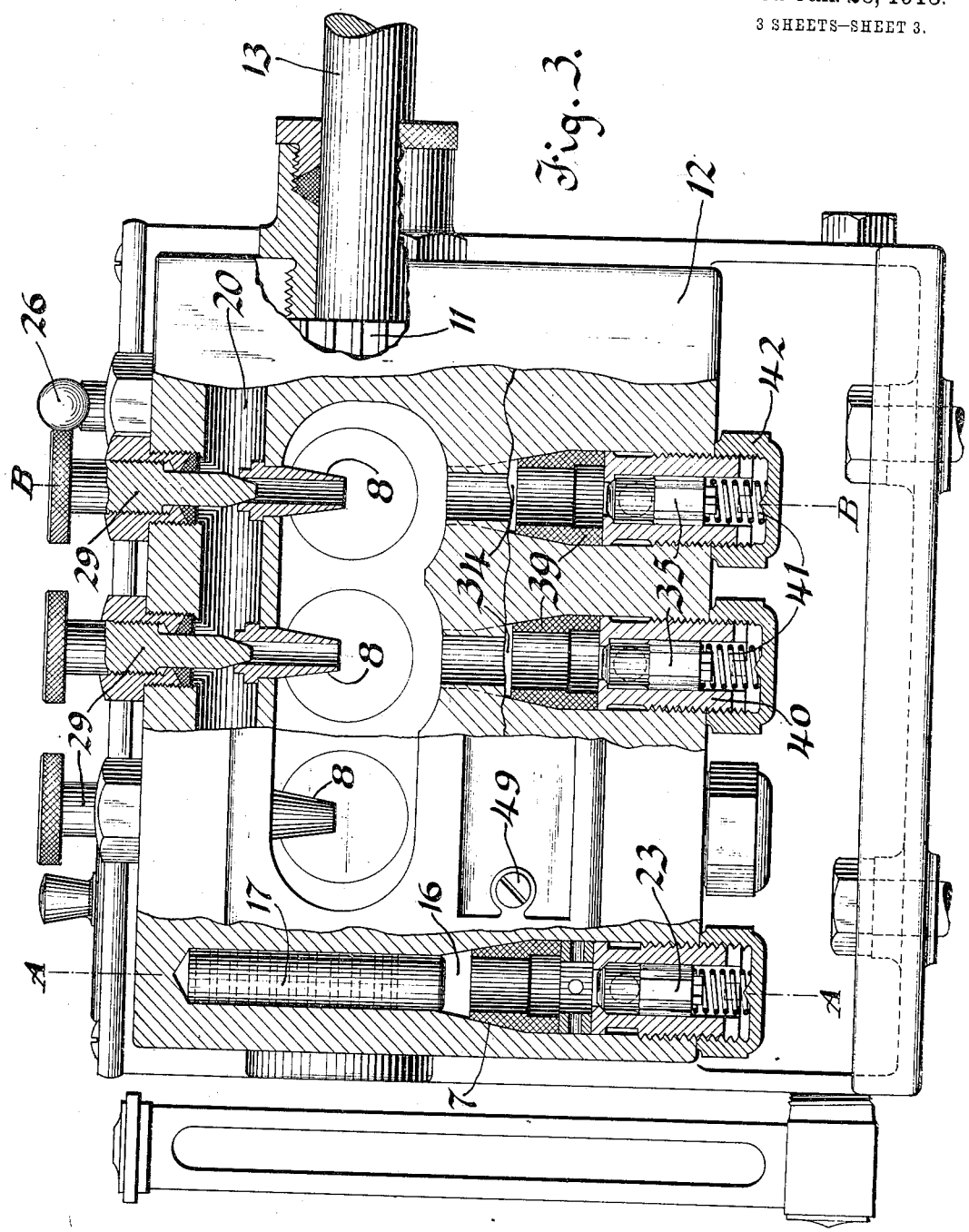

WILBER E. RICHARDSON AND ROBERT R. KEITH, OF MILWAUKEE, WISCONSIN, ASSIGNORS TO THE RICHARDSON-PHENIX COMPANY, A CORPORATION OF WISCONSIN.

FORCE-FEED LUBRICATING APPARATUS.

1,051,449.  Specification of Letters Patent.  Patented Jan. 28, 1913.

Application filed October 31, 1907. Serial No. 400,092.

*To all whom it may concern:*

Be it known that we, WILBER E. RICHARDSON and ROBERT R. KEITH, citizens of the United States, and residents of Milwaukee, in the county of Milwaukee and State of Wisconsin, have made a new and useful Invention in Force-Feed Lubricating Apparatus, of which the following is a specification.

This invention relates to lubricators and more particularly to force feed lubricators.

A serious difficulty encountered with force feed and other lubricating apparatus, which operate in connection with the cylinders of engines and like machines where the lubricant delivery nozzles are subjected to varying pressures, results from the fact that air is forced by the oil delivery pumps into the conducting or delivery passages of the apparatus. This air, as well as small globules of air, which may be held in suspension in the lubricant, collects in the conducting passages wherever air domes are possible and, by forming elastic cushions, which contract and expand in response to the variations of pressure to which the delivery nozzles are subjected, interferes with and often prevents an accurate operation of the lubricating apparatus.

One of the most important objects of our invention is, therefore, the production of a lubricator which will deliver lubricant free of air to the conducting or delivery passages.

A further object is the production of a force feed lubricating apparatus in which the conducting passages between the lubricant delivery pumps and the apparatus to be lubricated are filled with a solid column of lubricant, which moves forward to positively deliver lubricant each time the feed pumps force an additional quantity of lubricant into the conducting passages, and only then.

A further object is the production of an apparatus which will deliver regulable quantities of lubricant to the apparatus to be lubricated and which will respond at once to adjustment of the regulating devices.

These and other specific objects, which will be disclosed in the further description of the apparatus, are attained by utilizing a lubricator embodying the features herein described and illustrated.

Figure 1:
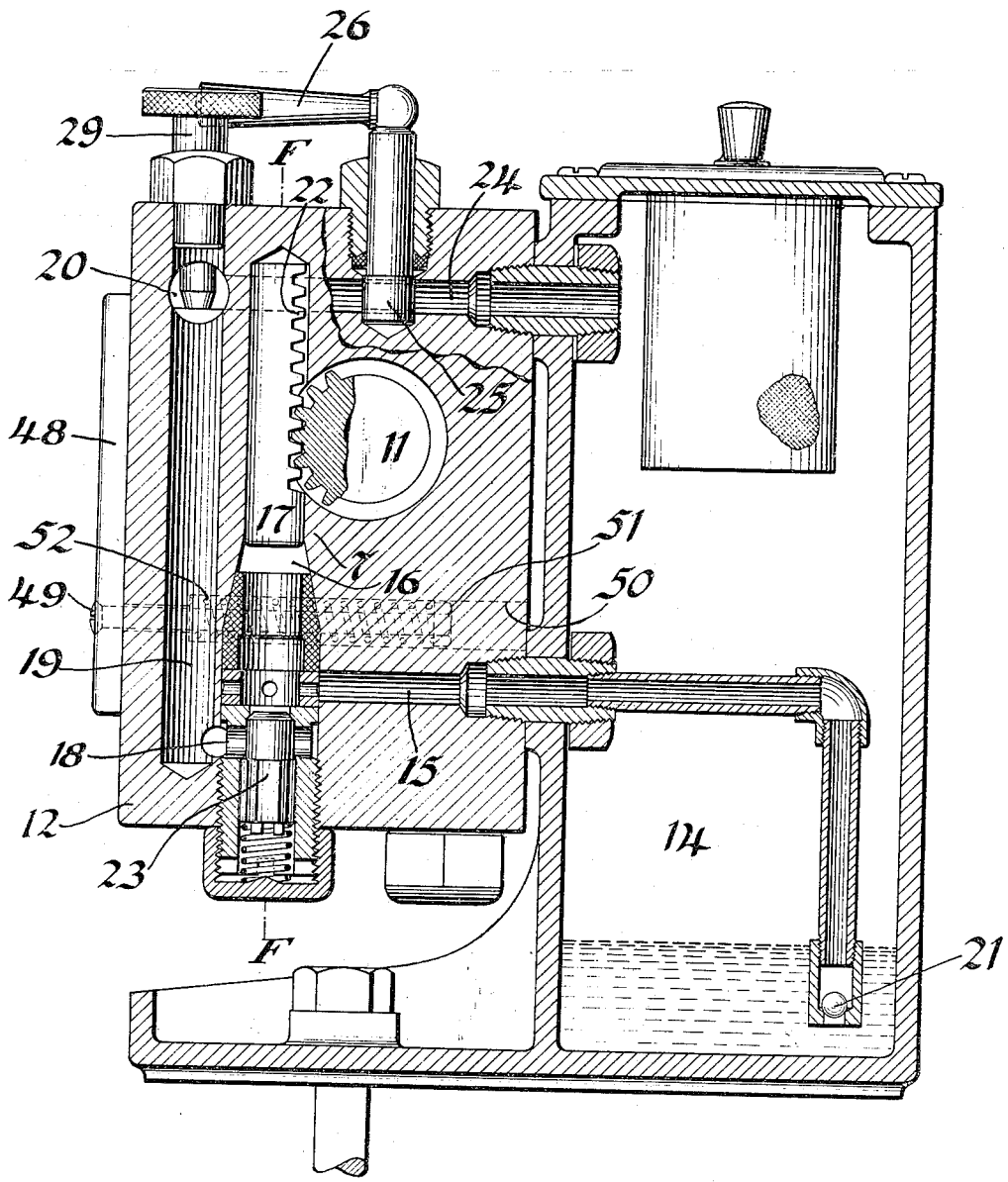
Figure 2:
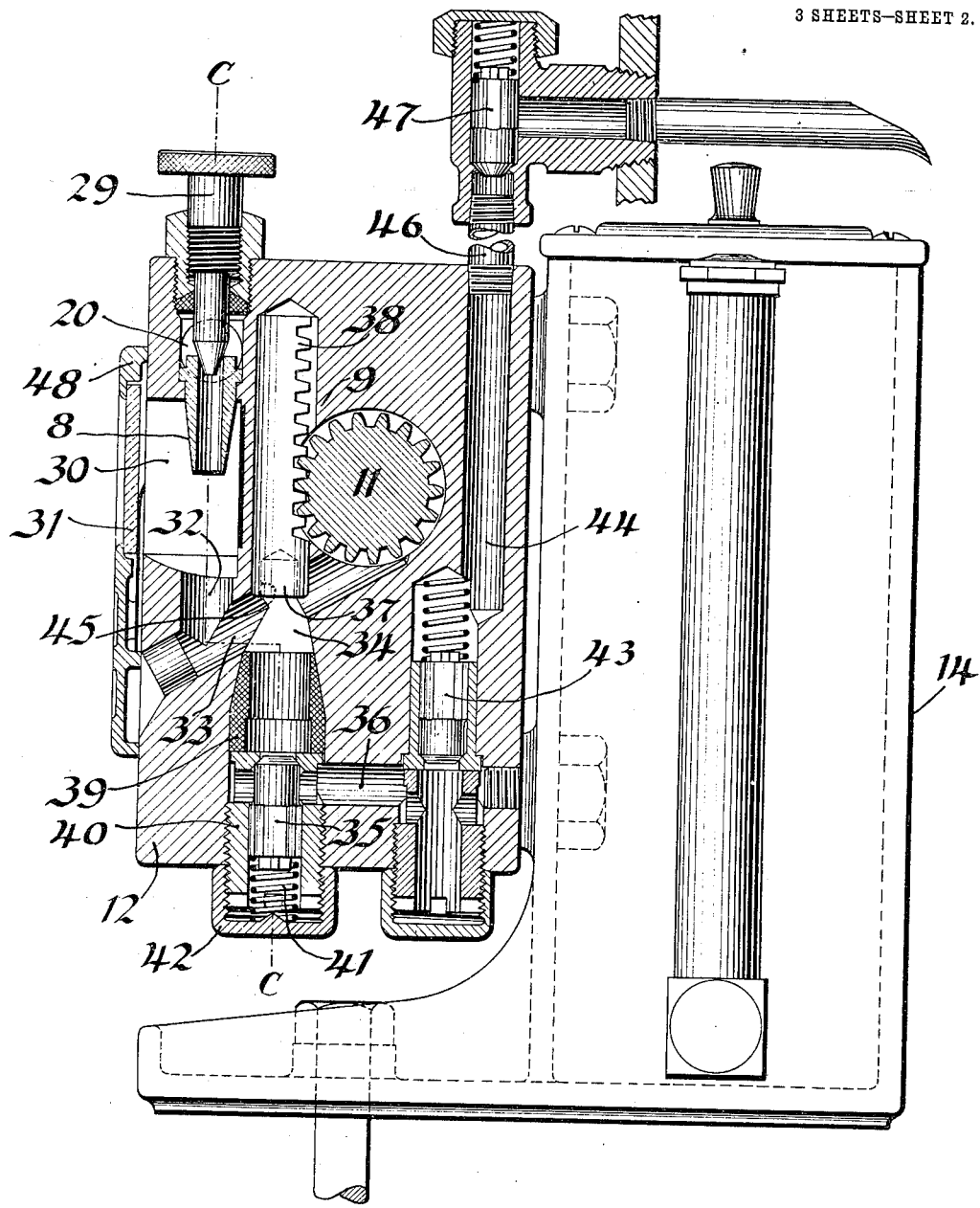

In the drawings accompanying this application, Figure 1 is a sectional elevation along the line A—A of Fig. 3; Fig. 2 is a sectional elevation along the line B—B of Fig. 3; and Fig. 3 is a partial section and partial elevation of a lubricator embodying our invention. A portion of Fig. 3 is shown in section along the line C—C of Fig. 2 and a portion is shown along the line F—F of Fig. 1.

The lubricator illustrated in the drawing comprises a force pump 7 which delivers lubricant to a plurality of sight feed nozzles 8. Each nozzle 8 delivers regulable amounts of lubricant to a delivery pump 9, which is so arranged that it will deliver lubricant free of air to a conducting or delivery passage with which it communicates. The circulating pump 7 and each of the delivery pumps 9 (one being provided for each sight feed nozzle) are actuated by a cylindrical gear 11, which, with the pumps and sight feed nozzles 8, is located in a body portion 12. The gear 11, in its operation, oscillates through a desired arc and may be actuated by a separate motor directly connected to its shaft 13, or by any moving part of the apparatus to be lubricated.

A lubricant supply tank 14 is secured to the body portion 12 and supplies lubricant through a suitable check valve 21, communicating piping and a communicating passage 15, formed in the body portion, to the circulating pump 7. The pump 7 comprises a chamber 16 formed in the body portion, a plunger 17 operating therein and a valved delivery passage 18, which communicates through passages 19 and 20 with the sight feed nozzles 8. The chamber 16 is cylindrical and, extending vertically through the body portion, communicates with the cylindrical bore in which the gear 11 is located. The pump plunger 17 is provided with a rack 22, which meshes with the gear 11, and the lower end of the plunger forms a working fit with a composition ring which is located within the chamber 16. The delivery passage 18 is provided with a spring restrained check valve 23, which opens in response to pressure in the chamber 16 and delivers lubricant to the nozzles 8. The passage 20, with which all the sight feed nozzles 8 communicate, is provided with an overflow passage 24, which discharges into the upper part of the chamber 14. A regulating valve 25 is provided in the passage 24 and is adapted to wholly or partially close the discharge passage and thereby vary the pressure head of the lubricant supplied to the nozzles 8. Any suitable valve may be employed but we prefer an ordinary plug valve, which is provided with an operating handle 26 extending beyond the body portion 12.

Each nozzle 8 is provided with a regulating valve 29 and delivers lubricant to one of the pumps through a slight feed chamber 30, which is formed in the body portion 12 and which is provided with a transparent cover 31. The lubricant discharged from each nozzle 8 drops through the sight feed chamber and is received by a passage 32, which is formed in the body portion 12 and which communicates, by means of a short passage 33, intersecting and communicating with the pump chamber 34 of the pump 9 whereby an inlet port is formed. The pump chamber 34 extends vertically through the body portion 12 and communicates with the cylindrical bore in which the gear 11 operates. The lower end of the pump chamber 34 forms a clearance chamber within which the separation of air from the lubricant or oil is effected and the outlet from which is adapted to be closed by means of a check valve 35, which controls the delivery of fluid from the pump chamber to a communicating passage 36. A plunger 37 operates in the chamber and is provided at its upper end with a rack 38 which meshes with the cylindrical gear 11 and coöperates with it in transmitting to the plunger a reciprocating motion. The lower end of the plunger operates in the chamber 34 to force oil to the communicating passage 36 and is so positioned within the chamber that it covers and uncovers the passage 33 during its reciprocation.

The lower end of the chamber 34 is of increased diameter for the purpose of admitting a composition ring 39 and the casing 40 of the check valve 35. The portion of the chamber in which the ring 39 is located is conical in shape and the outer face of the ring is correspondingly tapered. The ring 39 surrounds the operating end of the plunger 37 and is secured in place by means of the valve casing 40, which is screwed into the body portion 12 and which is so arranged that it may be utilized to adjust the packing ring 39 for wear by forcing it upwardly into the chamber 34 against the inclined wall, whereby the ring is contracted and its internal diameter decreased.

The check valve 35 is forced upwardly against its seat by means of a spring 41, which is located within the casing 40 between the check valve and a cap nut 42. The valve is so arranged that it will respond to pressure in the pump chamber 34 and deliver lubricant from the chamber to the passage 36 but will not respond to pressure or suction exerted in or transmitted to the passage 36.

The lubricant delivered to the passage 36 is forced by the operation of a plunger past a spring-restrained check valve 43 which is arranged to respond to pump pressure and which communicates with a vertically-disposed passage 44 arranged in the body portion and communicating with suitable piping or passages 46, which constitute the conducting passages of the apparatus. Each conducting passage 46 is provided at its remote or delivery end with a spring restrained check valve 47 or valved delivery nozzle. The arrangement of the apparatus is such that the passage 36, the chamber of the check valve 43, the passage 44 and all the communicating pipes or passages are always filled with an exclusively liquid column so that the admission of additional lubricant from the pump 9 causes the column, in the communicating passages, to move forward and positively deliver to the apparatus to be lubricated a corresponding amount of lubricant. Due to the incompressibility of the column, the valve 47 operates in exact synchronism with the delivery pump in delivering lubricant. In order that the apparatus may perform this function accurately, and be independent of the pressure to which the delivery nozzle is subjected, it is necessary to provide means such that the plunger 37 cannot, under any circumstances, force air past the valve 35 and into the passage 36. We accomplish this by providing a chamber 45 in the lower end of the plunger 37, thereby increasing the clearance volume in the pump chamber and consequently limiting the final pressure to which the air in the chamber can be compressed by the plunger when the chamber is filled with air only. We then adjust the spring 41 so that the valve 35 will not respond to a pressure equal to or below that at which the air in the chamber 34 can be compressed by the plunger 37 when the chamber is filled with air and a predetermined amount of lubricant. Under such conditions the pump cannot operate to force fluid past the check valve 35 until the clearance space is sufficiently diminished by the admission of lubricant to the chamber 34 to cause the compression pressure to rise above that for which the valve 35 is adjusted. Upon the admission of lubricant to the pump chamber, the clearance volume in the chamber is decreased an amount corresponding to the volume of the lubricant admitted and consequently the final compression pressure which the plunger is capable of pumping is increased a corresponding amount. lubricant will be delivered through the valve 35 until the pressure in the chamber decreases to the pressure for which the spring 41 is adjusted.

The apparatus is so adjusted that the pump plunger cannot discharge all the lubricant from the chamber 34 and the valve 35 is so located in the clearance space as to be always covered with a predetermined amount of lubricant. Furthermore, the valves 43 and 35 are so placed that it is possible for the valve 43 to take up and fully perform the work of the valve 35 in case of failure of that valve. This is possible because the valve 43 is spring loaded and adjusted in proper proportion to the load imposed on the valve 35 so that it will hold a final compression pressure in the pump chamber which is insufficient to force lubricant past the seat of the valve 35. The seats of each of the valves 35 and 43 are substantially in the same horizontal plane and the connecting passage 36 is so arranged that there are no air domes possible. This construction makes it possible for the valve 43 to perform the functions of valve 35 in case of failure of the latter valve. Consequently, even in the ordinary operation of the apparatus, the valves 35 and 43 operate at practically the same time, and the passage 36 is always filled with lubricant. A lubricator so constructed and adjusted will not permit air to pass through the valve 35 into the passage 36, but, after the apparatus is in operation, will discharge into the passage 36 any amount of lubricant delivered to the chamber 34 by the nozzle 8. It will also be apparent that as soon as the oil delivered by the nozzle to the chamber 34 is forced past the valve, the pressure then existing in the chamber cannot be sufficient to keep the valve 35 open, and consequently no air can pass through the valve to the passage 36.

When a plunger 38 descends and closes an inlet port, which is formed by the intersection of the passage 33 with the chamber 34, oil and air will be trapped in chamber 34 and chamber 45, in the lower end of the plunger. The air will be compressed by the downward movement of the plunger and the oil will be subjected to this pressure. The oil itself is practically incompressible but bubbles of air contained therein will be compressed concentrically, as the pressure is transmitted by the oil equally in all directions. Now when the plunger rises the pressure on the oil is diminished and the air bubbles in the oil will expand to the size which they had before they were compressed, but this expansion will be eccentric and upward because less resistance is encountered in the upward direction. In other words, while the air bubbles are being compressed their centers remain in the same position but when the bubbles expand their centers rise so the effect is to raise the bubbles out of the oil by the alternate compression and expansion of them. The presence of the chamber 45 in the plunger insures the presence of air above the oil so that alternate compression and expansion of the air bubbles in the oil must take place as it should be remembered that the valve 35 is set to withstand a certain definite pressure before it will open.

The frame 48 does not fit air tight being yieldingly held in place by springs 52 and air separated from the oil can readily escape from the sight feed chamber 30, passing thereto through passages 33 and 32.

Fig. 1 of the drawings clearly shows the plunger 17 amply long enough to cover the passage 15 before the end of its stroke and long enough to complete its stroke and pump oil.

Another novel feature of our invention is the arrangement of the transparent wall 31 of the sight feed chamber 30. This wall consists of a suitable glass which is mounted in a frame portion 48. The frame portion is secured to the body portion 12 by means of screws 49 which extend into cylindrical bores 50 formed in the body portion and which are provided at their inner ends with spring blocks 51. A coil spring 52 surrounds each screw 50 and operates between its respective spring block and the body portion. With such an arrangement, when it is necessary to clean the inner surface of the glass or remove it from the frame 48, the frame is pulled forward, thereby compressing the springs 52 and permitting of access to the glass and the interior of the sight feed chamber. When the frame portion is released, the tension of the spring forces the screws back into position, thereby bringing the frame portion back to the front of the body portion.

The operation of the apparatus is as follows: The oscillations of the cylindrical gear 11 reciprocate the plungers 37 of the circulating pumps 9 and the plunger 17 of the force pump 7. When the plunger 17 of the force pump 7 moves to uncover the passage 15, lubricant is delivered from the supply chamber 14 to the pump chamber 16. The plunger in its downward movement first covers the passage 15 and then forces the lubricant confined in the pump chamber 16 past the check valve 23 into the passage 19, from which it is delivered to the passage 20, with which the nozzles 8 communicate. The lubricant delivered by the nozzles 8 of the individual feed pumps is delivered as has been described, to the apparatus to be lubricated through the check valves 47. These valves 47 are so constructed that they will not respond to a vacuum or zero pressure at their delivery sides. For this reason lubricant cannot be sucked or drawn from the passages 44 and 46 by a reduction of pressure on the delivery side of the valve.

In accordance with the provisions of the patent statutes, we have described the principle of operation of our invention, together with the apparatus which we now believe to represent the best embodiment thereof, but we desire to have it understood that the apparatus shown is only illustrative and that the invention can be carried out by other means.

What we claim is:

1. In an apparatus of the class described, a pump chamber, a plunger operating therein, a soft metallic packing surrounding said plunger, a valve controlling the delivery of fluid from said chamber and means including said valve for adjusting said packing for wear by compressing it and thereby decreasing its internal diameter.

2. In an apparatus of the class described, a pump chamber, a plunger reciprocating within said chamber, a solid packing ring surrounding said plunger, a check valve controlling the delivery of fluid from said chamber and means, including said valve, for adjusting said packing.

3. The combination in a pump for pumping oil or lubricant, of a pump body provided with a vertically disposed pump chamber having an oil and air inlet port and an oil outlet port separated vertically from each other, and a clearance chamber located between said ports, a plunger adapted to be reciprocated toward and into said clearance chamber toward said outlet port so as to cover said inlet port, and away from said outlet port and clearance chamber so as to uncover said inlet port, the said plunger being provided with an air chamber in its end which is adjacent the clearance chamber to insure the presence of a body of air in said clearance chamber above the oil therein when said plunger has been reciprocated so as to cover said inlet port and subject the oil in the clearance chamber to pressure.

4. The combination in a lubricant pump of a pump body provided with a vertically disposed pump chamber having an oil and air inlet port and an oil outlet port separated vertically from each other and a clearance chamber located between said ports, a plunger adapted to be reciprocated toward and into said clearance chamber toward said outlet port so as to cover said inlet port, and away from said outlet port and clearance chamber so as to uncover said inlet port, the said plunger being provided with an air chamber in its end which is adjacent the clearance chamber to insure the presence of a body of air in said clearance chamber above the oil therein when said plunger has been reciprocated so as to cover said inlet port and subject the oil in the clearance chamber to pressure, and a spring pressed valve controlling said outlet port to keep the said valve closed until the pressure in the clearance chamber has reached a predetermined pressure.

In testimony whereof, we have hereunto subscribed our names this 25th day of October, 1907.

WILBER E. RICHARDSON.
ROBT. R. KEITH.

Witnesses:
JOHN F. HARPER,
ROBERT N. MCMYNN.